United States Patent
Noyel et al.

(10) Patent No.: US 9,025,853 B2
(45) Date of Patent: May 5, 2015

(54) METHOD FOR DETERMINING MARKINGS IN RELIEF ON THE OUTER SURFACE OF THE SIDEWALL OF A TYRE

(75) Inventors: Guillaume Noyel, Clermont-Ferrand Cedex (FR); Jean-Paul Zanella, Clermont-Ferrand Cedex (FR); Alexandre Joly, Clermont-Ferrand Cedex (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/118,612

(22) PCT Filed: May 10, 2012

(86) PCT No.: PCT/EP2012/058607
§ 371 (c)(1),
(2), (4) Date: Mar. 14, 2014

(87) PCT Pub. No.: WO2012/156262
PCT Pub. Date: Nov. 22, 2012

(65) Prior Publication Data
US 2014/0219541 A1 Aug. 7, 2014

(30) Foreign Application Priority Data
May 19, 2011 (FR) .................................... 11 54348

(51) Int. Cl.
*G06K 9/00* (2006.01)
*G06K 9/44* (2006.01)
(Continued)

(52) U.S. Cl.
CPC ................. *G06T 7/0004* (2013.01); *G06T 5/30* (2013.01); *G06T 5/50* (2013.01); *G06T 7/0081* (2013.01);
(Continued)

(58) Field of Classification Search
CPC .. G06K 9/6204; G06K 9/6206; G06T 3/0068; G06T 3/0056; G06T 7/003; G06T 2207/10028; G06T 2207/20116; G06T 2207/30108; G06T 2207/20016; G06T 7/0004; G06T 5/50; G06T 5/40; G06T 5/30; G06T 2207/20224; G06T 2207/20036
USPC .......... 382/103, 104, 141–152, 190, 256–265
See application file for complete search history.

(56) References Cited

U.S. PATENT DOCUMENTS 6,591,669 B1 * 7/2003 Serra et al. ...................... 73/146
2011/0019903 A1 * 1/2011 Joly et al. ...................... 382/141
(Continued)

FOREIGN PATENT DOCUMENTS

EP 2 077 442 A1 7/2009
WO WO 02/48952 A1 6/2002

OTHER PUBLICATIONS

U.S. Appl. No. 14/112,452, filed Mar. 21, 2012, J.-P. Zanella.
U.S. Appl. No. 14/112,448, filed Mar. 21, 2012, J.-P. Zanella.
U.S. Appl. No. 14/118,598, filed May 10, 2012, G. Noyel.
U.S. Appl. No. 14/112,460, filed Mar. 21, 2012, J.-P. Zanella.
(Continued)

*Primary Examiner* — Brian Le
(74) *Attorney, Agent, or Firm* — Fitzpatrick, Cella, Harper & Scinto (57) ABSTRACT

A method of determining relief markings on a tire's sidewall surface includes assigning, to each pixel of a three-dimensional image of the surface, a grey-level value proportional to an elevation point corresponding to the pixel, to obtain a starting image. Using linear structuring elements of successively increasing sizes and oriented circumferentially, a series of successive morphological openings is performed iteratively on the starting surface. An image value obtained after a morphological opening using a structuring element is subtracted from an image value obtained after a morphological opening using a structuring element of an immediately lower size, to obtain a succession of images flattened by differencing. A thresholding operation is performed on the images flattened by differencing, to obtain binary images. A set-theoretic union of values of each of the binary images is performed, to obtain a final binary image in which markings appear in relief.

17 Claims, 5 Drawing Sheets

(51) Int. Cl.
*G06T 7/00* (2006.01)
*G06T 5/30* (2006.01)
*G06T 5/50* (2006.01)
*G06T 5/40* (2006.01)

(52) U.S. Cl.
CPC ..... G06T 7/0091 (2013.01); *G06T 2207/20036* (2013.01); *G06T 2207/30108* (2013.01); G06T 5/40 (2013.01); *G06T 2207/20224* (2013.01)

(56) References Cited

U.S. PATENT DOCUMENTS

| | | | |
|---|---|---|---|
| 2013/0202156 A1 | 8/2013 | Joly et al. | 382/104 |
| 2013/0208949 A1 | 8/2013 | Joly et al. | 382/103 |
| 2013/0266189 A1 | 10/2013 | Vinciguerra et al. | 382/104 |
| 2013/0266225 A1 | 10/2013 | Vinciguerra et al. | 382/190 |

OTHER PUBLICATIONS

K.L. Mak et al., "Fabric defect detection using morphological filters," Image and Vision Computing, vol. 27 (2009) pp. 1585-1592.

M. Ito et al., "Morphological Operations by Locally Variable Structuring Elements and Their Applications to Region Extraction in Ultrasound Images," Systems and Computers in Japan, vol. 34, No. 3 (2003) pp. 33-43.

J. Chang et al., "Cork Quality Classification System using a Unified Image Processing and Fuzzy-Neural Network Methodology," IEEE Transactions on Neural Networks, vol. 8, No. 4 (1997) pp. 964-974.

S. Yang et al., "A Multi-Scale Morphologic Runway Detector," 2010 $2^{nd}$ International Conference Computer Engineering and Technology (ICCET), IEEE, Piscataway, NJ (Apr. 16, 2010) pp. V4-524-V4-528.

S. Lefevre, "Beyond morphological size distribution," Journal of Electronic Imaging, vol. 18, No. 1 (anuary 2009) pp. 013010-1-013010-10.

* cited by examiner

Fig 1

Fig 2 $\quad \gamma_{150}(f)$

Fig 3 $\quad f - \gamma_{150}(f)$

Fig 4 $\quad seg_1(\rho_{500}(f - \gamma_{150}(f)))$

Fig 5  $\gamma_{500}(f)$

Fig 6  $\gamma_{150}(f) - \gamma_{500}(f)$

Fig 7  $seg_2(\gamma_{150}(f) - \gamma_{500}(f))$

Fig 8  $\gamma_{7000}(f)$

Fig 9     $\gamma_{500}(f) - \gamma_{7000}(f)$

Fig 10    $seg_3(\gamma_{500}(f) - \gamma_{7000}(f))$

Fig 11    $seg = seg_1 \cup seg_2 \cup seg_3$

Fig 12

Fig 13  $\phi_{17000}(\gamma_{7000}(\phi_{500}(\gamma_{500}(f))))$

Fig 14  $A$  $seg_2$

Fig 15  $seg_2^{cor}$

Fig 16  $seg^{cor} = seg_1 \cup seg_2^{cor} \cup seg_3^{cor}$

METHOD FOR DETERMINING MARKINGS IN RELIEF ON THE OUTER SURFACE OF THE SIDEWALL OF A TYRE

FIELD OF THE INVENTION

The invention relates to the field of tyre manufacture, and lies more generally within the domain of operations for monitoring the exterior or interior aspect of tyres during or at the end of the manufacturing process, with the aim of determining compliance thereof with respect to established monitoring references.

BACKGROUND

The industrial automatic monitoring means developed by tyre manufacturers, and intended especially to assist the operators responsible for visual monitoring, call widely upon image processing techniques.

The methods employed to perform these processings consist, as a general rule, in comparing a two-dimensional or preferably three-dimensional image of the surface of the tyre to be inspected, with a two-dimensional and preferably three-dimensional reference image of the surface of the said tyre.

Hence, one of the steps of this process consists, in a known manner, in acquiring the three-dimensional image of the surface of the tyre, with the aid, for example, of means based on the principle of optical triangulation, implementing for example a 2D sensor coupled to a lighting source of laser type.

The topographic image of the surface of the tyre is as a general rule a two-dimensional image, termed a grey level image, in which, with any point, i.e. with any pixel (x, y) of the image, is associated a value f(x, y), called the grey level, and representing the altitude of this point with respect to the surface. This grey level value can usefully be coded on 8, or 16 bits or indeed 32 bits for better dynamic range. For coding on 8 bits, the value 255 (white) corresponds to the highest altitude, and the value 0 (black) corresponds to the lowest altitude.

The continuation of the process for analysing the image obtained then consists, inter alia, in identifying the reliefs of the surface to be inspected. This step is particularly significant within the framework of the analysis of the external part of the tyre in that the markings borne by the sidewall must be precisely located and identified, so as not to be considered to be surface anomalies.

These markings are formed by relief patterns projecting from the mean surface of the sidewall by a few tenths of a millimeter.

A first, known, method for extracting these relief patterns consists in determining the mean value of the camber of the sidewall, and in regarding the difference between the real camber of the sidewall and the mean camber as etching patterns.

It is observed, however, that the real camber of the sidewall can exhibit circumferential variations whose amplitude exceeds the excess elevation of the patterns borne by the sidewall, therefore giving rise to poor detection of the patterns in the zones considered.

BRIEF DESCRIPTION OF EMBODIMENTS OF THE INVENTION

The object of the method according to the invention is to afford a solution to the problem posed.

This method for extracting the relief marking patterns featuring on the surface of the sidewall of a tyre relies on regarding the grey level image featuring the reliefs of the marking patterns as a black and white image, on which it becomes possible, with the aim of extracting the information sought, to make ample use of the properties of morphological operators, after having adapted them to the peculiarities of the tyre.

The morphological operators commonly used are morphological openings and closings, morphological dilations or erosions, using adapted structuring elements.

A structuring element is a set used to survey the image studied. It is possible to see it as a tool which would make it possible to erode (i.e. remove material) or to dilate (i.e. add material) to an image. Thus, the dilation of the function f (i.e. the grey levels image) by a structuring element B, denoted $\delta_B(f)$, is the function which gives at any pixel $x \in E$ the maximum value of the image f in the observation window defined by B, such that: $\delta_B(f)(x) = \sup\{f(x-y), y \in B\}$.

In the same manner, the erosion of the function f (i.e. image grey levels image) by the structuring element B, denoted $\epsilon_B(f)$, is the function which gives at any pixel $x \in E$ the minimum value of the image f in the observation window defined by B, such that: $\epsilon_B(f)(x) = \inf\{f(x-y), y \in B\}$.

A morphological opening by addition $\gamma_B$ is defined as the composition of an erosion $\epsilon_B$ with a dilation $\delta_B$ for a structuring element B such that: $\gamma_B(f) = \delta_B \circ \epsilon_B(f)$. Conversely, a morphological closing $\phi_B$ is defined as the composition of a dilation $\delta_B$ with an erosion $\epsilon_B$ for a structuring element B, such that: $\phi_B(f) = \epsilon_B \circ \delta_B(f)$.

The operation which consists in taking the difference between an image f and the transform of this image by morphological opening $\gamma_B$, also known by the name top-hat, is denoted $\rho_B(f) = f - \gamma_B(f)$.

The method according to the invention envisages the steps in the course of which:

A—the three-dimensional image of the said surface of the sidewall of a tyre is captured while assigning to each pixel of the image a grey level value proportional to the elevation of this point with respect to the said surface, so as to obtain a starting image, B—with the aid of linear structuring elements of successively increasing sizes and oriented in the circumferential direction, a series of morphological openings of the image of the starting surface is carried out, C—the value of an image obtained after morphological opening with a structuring element is subtracted from the value of the image obtained after morphological opening with the aid of the structuring element of immediately lower size, so as to obtain a succession of images flattened by differencing, while initializing the procedure by the subtraction of the image obtained with the aid of the structuring element of smaller size from the starting image, D—a thresholding of the images flattened by differencing is carried out, so as to obtain binary images, E—the set-theoretic union of each of the binary images is performed so as to obtain a final binary image, in which only the marking patterns appear in relief.

The fact is exploited that the pixels of the images of the sidewall in the circumferential direction have approximately the same altitude. By using structuring elements of judiciously chosen size, the raised objects having a size greater than the size of the structuring element are deleted, thereby making it possible, by differencing, to successively reveal the patterns of increasing circumferential length while sidestepping the circumferential camber of the sidewall, here regarded as the geometry of the sidewall in a radial plane.

For greater working convenience, it is judicious to unfold the image of the surface of the sidewall in an orthogonal reference frame in which the abscissa axis represents the circumferential values, and the ordinate axis represents the radial values.

In an advantageous manner, in the case of the analysis of the surface of a tyre, three successive iterations of opening of the image of the surface with the aid of a first, of a second and of a third structuring element, seem sufficient to extract the information desired in the course of step B.

As a function of the definition of the image, the size of the structuring elements will then be chosen so that the first linear structuring element is formed of a number of pixels corresponding to a length lying between 4 and 10 mm, that the second linear structuring element is formed of a number of pixels corresponding to a length lying between 15 and 30 mm, and that the third linear structuring element is formed of a number of pixels corresponding to a length lying between 200 and 400 mm.

To improve the filtering on completion of step C, it is advantageously possible to transform at least one flattened image by performing a morphological opening with the aid of a linear structuring element oriented in the radial direction, and to subtract this resulting image from the said flattened image.

In this case, the structuring element will advantageously be able, as a function of the definition of the image, to be formed of a number of pixels corresponding to a length lying between 15 and 30 mm.

By relying on the height variation induced by a variation of grey shade, it is particularly beneficial, in the course of step D, to perform a thresholding of the grey level corresponding to a height variation of greater than or equal to 0.15 mm. In the case of the tyre, this height is less than the mean height of the patterns that it is sought to pinpoint.

In an optional manner, to sidestep wrong detections it is possible, on completion of step D, to eliminate from the binary image the patterns not re-entering into the height criteria usually corresponding to the graphical and ornamental patterns that it is sought to select on the sidewall of a tyre. Accordingly:
  the disjoint patterns in the binary image of the surface are identified,
  the image of the camber of the starting surface is determined,
  for a pattern considered, from the grey level value of the pixels forming this pattern in the starting image is subtracted the grey level value of the pixels corresponding to this pattern in the image of the camber, so as to obtain a flattening of the pattern,
  the mean value and the standard deviation of the grey levels of the said flattened pattern are calculated,
  in the binary image, this pattern is deleted when:
    the mean value of the grey levels does not lie in a given interval and
    the standard deviation of the grey levels is greater than a predetermined threshold,
    so as to obtain a corrected binary image, in which the wrongly detected patterns are deleted.

To determine the camber of the surface of the sidewall, there is performed alternately a series of morphological openings of the starting image with the aid of linear structuring elements of increasing size and oriented in the circumferential direction, so as to obtain an image of the camber of the surface in which the salient patterns and the sunken and raised objects are deleted.

With experience, in the case of tyres, it will be possible usefully to perform successively: a morphological opening of the starting image with the aid of a linear structuring element comprising a number of pixels corresponding to a length lying between 4 and 10 mm, a morphological opening of the previous image with the aid of a structuring element comprising a number of pixels corresponding to a length lying between 200 and 400 mm, and a morphological opening of the previous image with the aid of a structuring element comprising a number of pixels corresponding to a length lying between 500 and 800 mm.

To eliminate the abnormal grey level values it will be possible also, before subtracting the image of the camber from the starting image, to enclose each of the patterns considered by an encompassing box containing only the identified pattern considered, and to carry out a flattening of the imagette containing the pattern considered.

For tyres of usual dimensions, the interval of the average of the grey levels will advantageously be able to correspond to a height variation lying between 0.2 mm and 0.3 mm, and the value of the threshold of the standard deviation of the grey levels corresponds to a height variation of less than or equal to 0.2 mm.

BRIEF DESCRIPTION OF THE DRAWINGS

The object of the description which follows is to give the detailed indications on the implementation of the method based on an example, and relies on FIGS. 1 to 16, in which.

DETAILED DESCRIPTION OF EMBODIMENTS OF THE INVENTION

Figure 1:
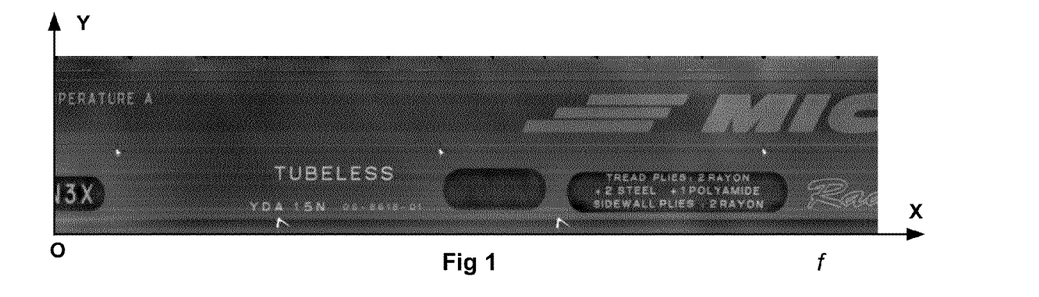
FIG. 1 represents a two-dimensional grey level image of the topographic surface of the sidewall of a tyre

The image of FIG. 1 represents a partial view of the image of the sidewall of a tyre. This image is obtained with the aid of a means calling upon technologies known per se such as laser triangulation.

As a general rule, the two-dimensional image of the surface of a tyre is a grey level image, such as represented in FIG. 1, in which, with any point or pixel x=(i, j) of the plane (E=[1, 2, . . . ]×[1, 2, . . . ], with E ⊂ $\square^2$) represented in the form of a point grid (that is to say a 2D array), is associated a value $f(x) \subset T$ with $T \subset \square$. Generally, T consists of integer values lying between 0 and 255. The grey level value represents the altitude of this point with respect to the topographic surface of the tyre.

For a car tyre of standard dimension, the image is calibrated in such a way that the variation of a grey level unit corresponds to a height of about 0.01 mm.

The number of pixels of the image naturally depends on the choice of the camera used and the mode of input, but it is commonplace to produce images comprising 40 000×5000 pixels to represent the whole of the sidewall.

For calculation convenience reasons, the polar coordinates of the circular image of the sidewall of the tyre are transformed into orthogonal coordinates. The image of FIG. 1 is represented in the said orthogonal reference frame in which the abscissa axis OX represents the circumferential values and the ordinate axis OY represents the radial values.

The following step of the method according to the invention consists in performing series of morphological openings of the image of the surface with the aid of a structuring element having the form of a segment oriented in the circumferential direction, i.e. along the axis OX, so as to sidestep the camber of the surface of the sidewall, by considering that this camber is substantially the same for a given radial value.

The structuring element is of small size with respect to the circumferential variations of the said camber, thereby making it possible to also sidestep the drawbacks cited in the introduction relating to the circumferential variation of the camber.

Finally, the size of the structuring elements makes it possible to select the relief patterns that it is desired to detach from the surface of the sidewall.

Thus, within the framework of the present description, successive use is made of a first structuring element comprising a number of pixels corresponding to a length lying between 4 mm and 10 mm, thereby corresponding to approximately 150 pixels. This size makes it possible to select, as will be seen subsequently, writing comprising characters of small dimension.

The second structuring element comprises a number of pixel corresponding to a length lying between 15 mm and 30 mm, which within the framework of the example serving as support to the present description represents about 500 pixels. This size makes it possible to select the patterns of larger surface corresponding to the letters and to the ornaments featuring on the sidewall.

The third structuring element comprises a number of pixels corresponding to a length lying between 200 mm and 400 mm, which correspond to about 7000 pixels, and which makes it possible to select the decorative elements spread over the circumference such as banners or adjoining series of character.

Figure 2:
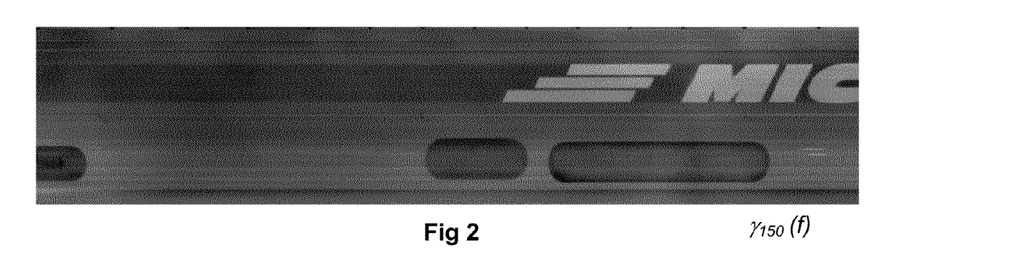
FIG. 2 represents the same image after a first morphological opening.
Figure 5:
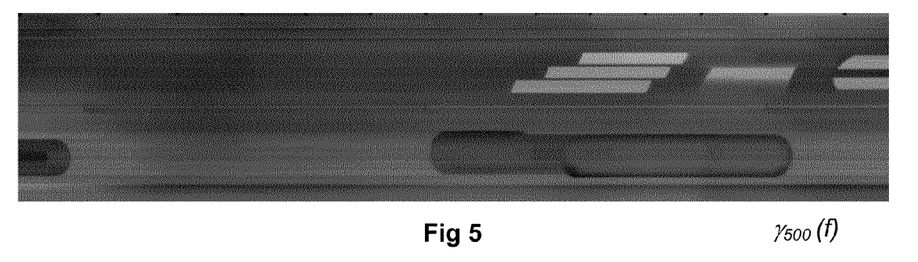
FIG. 5 represents the starting image transformed with the aid of a second morphological opening.
Figure 8:
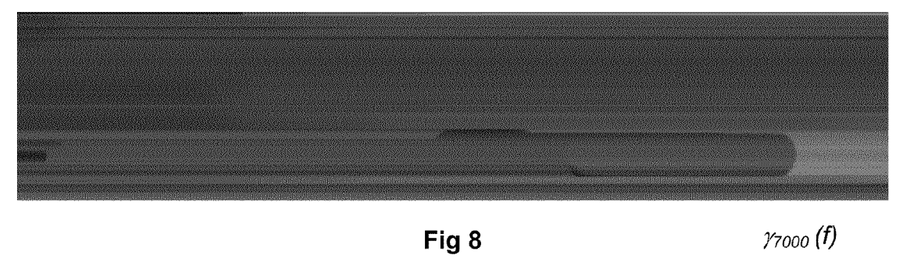
FIG. 8 represents the starting image transformed with the aid of a third morphological opening.

The series of morphological opening of the surface f, denoted respectively $\gamma_{150}(f)$, $\gamma_{500}(f)$, and $\gamma_{7000}(f)$ is carried out. The images obtained are reproduced respectively in FIGS. 2, 5 and 8. It is observed that in FIG. 2 the characters forming the regulatory inscriptions have disappeared. The characters featuring the brand have disappeared in FIG. 5. And FIG. 8 no longer comprises any decorative patterns or characters.

By computing the difference between the image obtained by morphological opening with the aid of a structuring element and the image obtained after morphological opening with the aid of the structuring element of immediately higher size, a succession of images is obtained, flattened by differencing, in which only the patterns that have disappeared from one opening to another remain.

The difference between two images consists, for each of the pixels i, j of the image, in computing the difference in grey level. It will be observed that, in the course of this operation, the resulting image is a relief image in which the patterns appear on a plane and no longer on a cambered surface.

The calculation is initialized by computing the difference between the image obtained by morphological opening of the starting image f with the aid of the structuring element of smaller size $\gamma_{150}(f)$, and of the starting image f.

Figure 3:
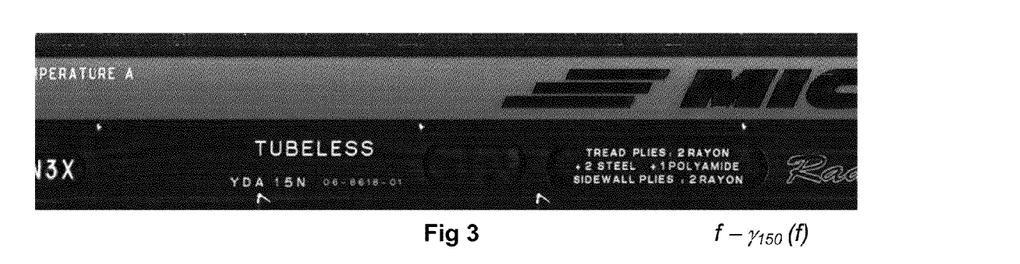
FIG. 3 represents the starting image after subtraction of the image of FIG. 2.
Figure 6:
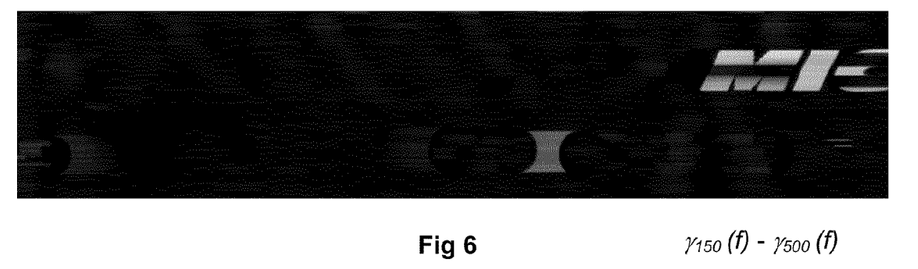
FIG. 6 represents the image of FIG. 2 after subtraction of the image of FIG. 5.
Figure 9:
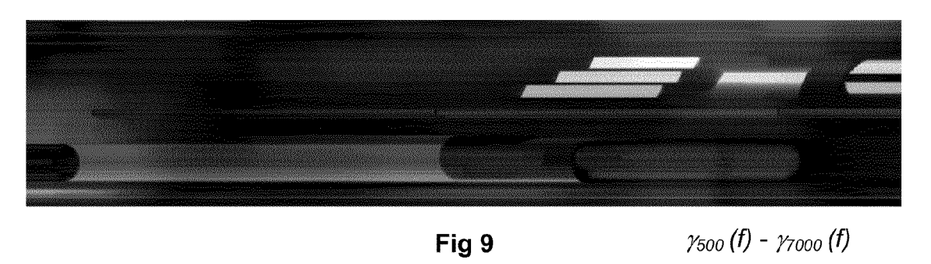
FIG. 9 represents the image of FIG. 5 after subtraction of the image of FIG. 8.

These flattenings are denoted respectively $f-\gamma_{150}(f)$, $\gamma_{150}(f)-\gamma_{500}(f)$ and $\gamma_{500}(f)-\gamma_{7000}(f)$ and are represented in FIGS. 3, 6 and 9. It is observed on these images that the relief patterns reappear successively.

To select the patterns sought, a thresholding of each of these images is carried out so as to obtain binary images in which the patterns appear in white and the background in black.

This operation is carried out by assigning the highest grey level value (white) to the pixels whose grey level is above a given threshold, and the zero value (black) to the pixels whose grey value is below this threshold.

To avoid wrong detections, this threshold must correspond to a height just less than the minimum height of the patterns, although without being too low, so as to avoid considering insignificant height variations to be relief patterns. For a car tyre of standard dimension, this threshold is about 0.15 mm, this corresponding approximately to some fifteen or so grey level units.

These binary images are denoted respectively $seg_1(f-\gamma_{150}(f))$, $seg_2(\gamma_{150}(f)-\gamma_{500}(f))$ and $seg_3(\gamma_{500}(f)-\gamma_{7000}(f))$.

Figure 7:
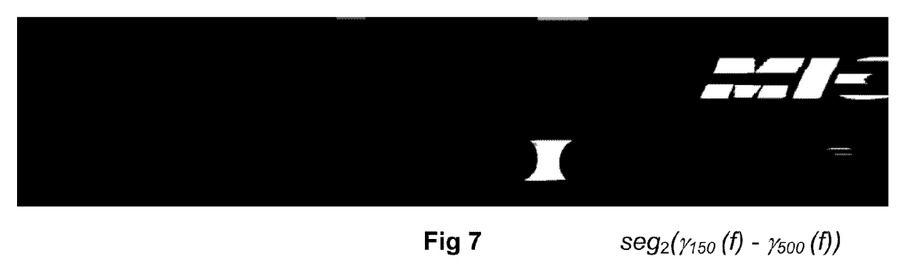
FIG. 7 represents the binary image of the image of FIG. 6.
Figure 10:
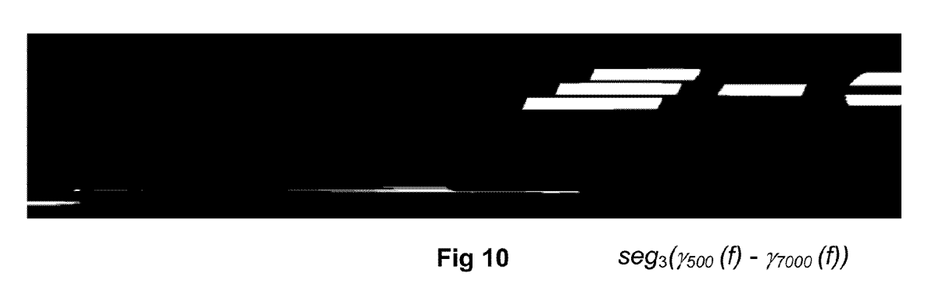
FIG. 10 represents the binary image segmented by thresholding of the image of FIG. 9, the image of FIG. 11 represents the union of the images of FIGS. 4, 7 and 10.

FIGS. 7 and 10 illustrate the binary images $seg_2(\gamma_{150}(f)-\gamma_{500}(f))$ and $seg_3(\gamma_{500}(f)-\gamma_{7000}(f))$, obtained after segmentation of the flattened images and illustrated by FIGS. 6 and 9.

So as to improve the detection of the patterns, by eliminating the small detection anomalies originating from small circumferential irregularities such as burrs, it is possible, in an optional manner, to carry out a series of additional operations on the flattened image.

These operations consist in carrying out a top-hat of the flattened image with the aid of a linear structuring element oriented in the radial direction. The size of this structuring element, in the case of a car tyre of standard dimension, can usefully lie between 15 and 30 mm, thus corresponding in the case of the example serving as support to the present description to about 500 pixels.

Figure 4:
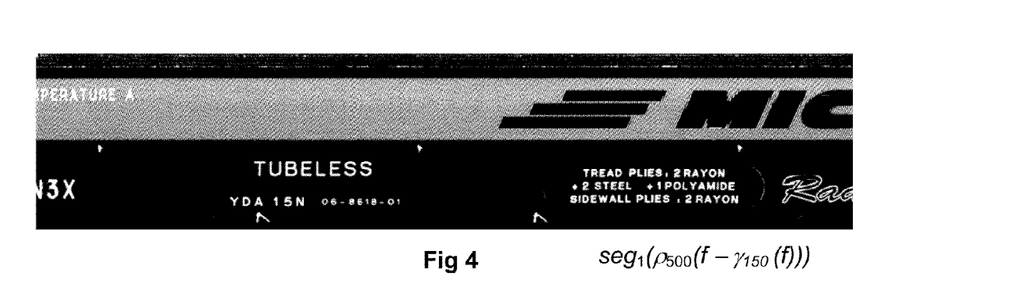
FIG. 4 represents the binary image of the image of FIG. 3 on which a top-hat has been carried out previously with the aid of a radial structuring element.

This resulting image, in the case of the first flattened image, is denoted $\rho_{500}(f-\gamma_{150}(f))=(f-\gamma_{150}(f))-\gamma_{500}(f-\gamma_{150}(f))$, and appears in its binary form, $seg_1(\rho_{500}(f-\gamma_{150}(f)))$, in FIG. 4.

To obtain the image containing all the relief patterns sought, the set-theoretic union of the binary images is performed. This final binary image denoted $seg=seg_1 \cup seg_2 \cup seg_3$ is illustrated in FIG. 11.

It is appropriate to note at this juncture of the description of an embodiment of the invention that the number of morphological openings, of flattened images and of binary images is not limited to 3, and that it can be increased or reduced at the choice of the user of the method according to the invention. The conduct of the calculation steps remains the same, and the results obtained are of the same nature. It nonetheless turns out that this limitation to three morphological openings is particularly well adapted for the case of car tyres of standard dimension. Increasing the number of steps, which will be done necessarily to the detriment of the calculation time, can make it possible to solve the case of tyres of larger dimension exhibiting particular graphical ornaments or in which the sizes or the heights of the relief markings vary greatly.

Figure 11:
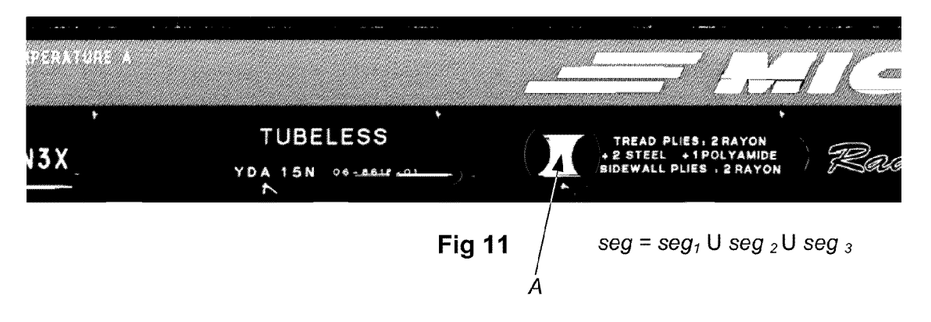
Figure 12:
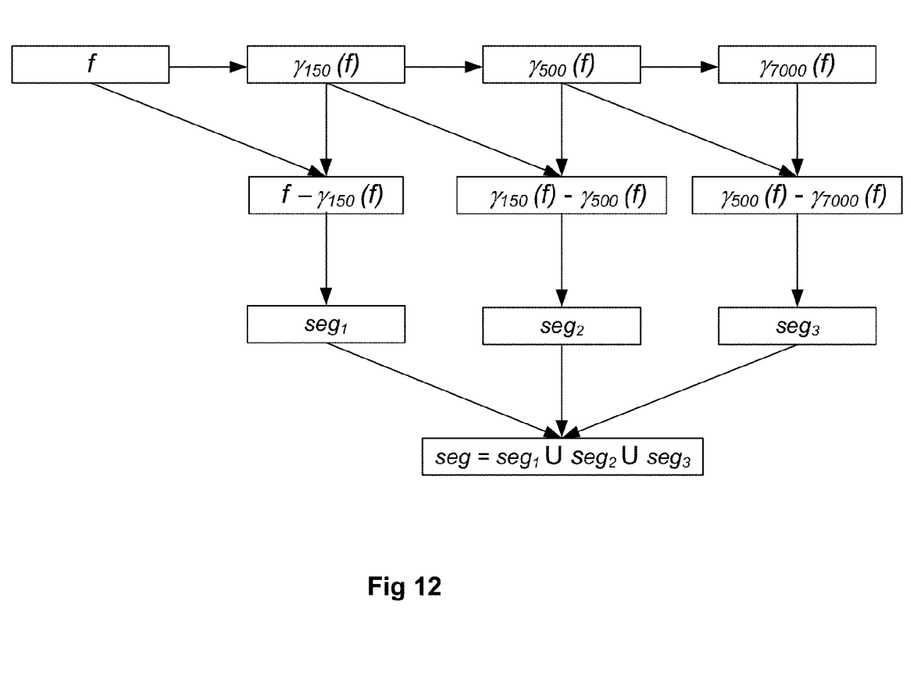
FIG. 12 represents a functional chart of the processing of the starting image according to the invention.

It is observed in the image of FIG. 11, however, that relief elements may appear wrongly in the binary images obtained in the course of the previously described steps. These elements correspond to locally excessively elevated zones which are unduly regarded as patterns. Thus, the zone A situated between the two bars and tagged by an arrow is liable to constitute a wrong detection.

It may then be useful to remove these abnormal elements from the image with the aid of operations implementing the morphological operators presented hereinabove.

To achieve this objective, we begin from the observation that the relief patterns that it is sought to preserve, be they decorative patterns or be they formed by sequences of alphanumeric characters, have substantially a regular and identical height. It will then suffice to eliminate from the binary image $seg_i$ the zones exhibiting an abnormal height or very dispersed variations of height, to obtain a corrected binary image, $seg_i^{cor}$.

The first step of this optional process consists in identifying the patterns appearing in relief on the binary image $seg_i$, and which appear in white on the black background of the said image. An identification number is allocated to each of these patterns and to each of the pixels constituting this pattern. Care will be taken that two disjoint patterns are not identified by the same number. Here, disjoint is intended to mean patterns mutually separated by pixels belonging to the background of the relief coloured black and whose grey level value is equal to zero, so that it is not possible to move in a continuous manner from one arbitrary pattern to another arbitrary pattern without crossing a black coloured space.

The camber of the surface of the sidewall is thereafter determined on the basis of the starting surface f. Accordingly, a series of morphological openings and closings of the starting surface f is undertaken alternately, with the aid of linear structuring elements oriented in the circumferential direction and whose size is increasing, so as to obtain a surface in which the patterns with excess elevation, as well as the abnormal troughs are eliminated. This operation is denoted $\phi_{es1} \circ \gamma_{es2} \circ \phi_{es3} \circ \ldots \circ \gamma_{esn}(f)$, in which $es1 \geq es2 \geq es3 \geq \ldots esi \ldots \geq esn$.

The number of opening and of closing is not limiting, but it is observed that the result obtained is no longer modified in a significant manner beyond a limited number of operations. The length of the structuring elements is adapted, as previously, to the size of the relief patterns present on the surface of the sidewall.

Figure 13:
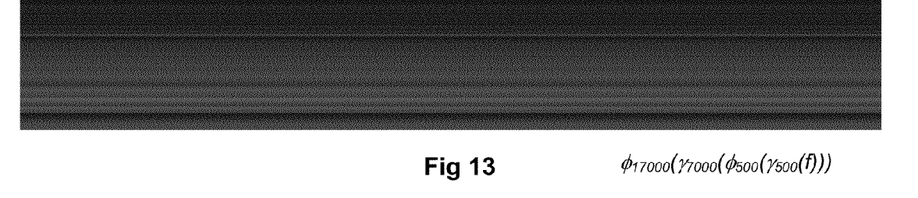
FIG. 13 represents the image of the camber of the sidewall.

In the example which follows, it is apparent that a series comprising two morphological openings and two morphological closings turned out to be sufficient to obtain a significant result. The structuring elements are adapted accordingly, and have a size the number of pixels of which corresponds to lengths varying from a few millimeters to a few hundred millimeters. FIG. 13 illustrates the image of the camber of the image f of FIG. 1, in which the structuring elements successively comprise 500, 500, 7000 and 17 000 pixels, $camber(f)=\phi_{17000}(\gamma_{7000}(\phi_{500}(\gamma_{5000}(f))))$.

It is easily possible to identify the pixels of the starting image and the pixels of the image of the camber bearing the same label as the pattern that it is sought to examine.

From the grey level value of the pixels constituting the said pattern and belonging to the starting image is then subtracted the grey level value of the pixels of the same pattern and belonging to the previously obtained image of the camber $diff_A(f)=A(f)-camber_A(f)$.

This operation amounts to carrying out a flattening of the pattern considered.

In an optional manner it is possible, prior to this subtraction operation, to carry out an additional filtering operation, so as to extract the abnormal grey level values liable to appear in the image of the pattern.

Figure 14:
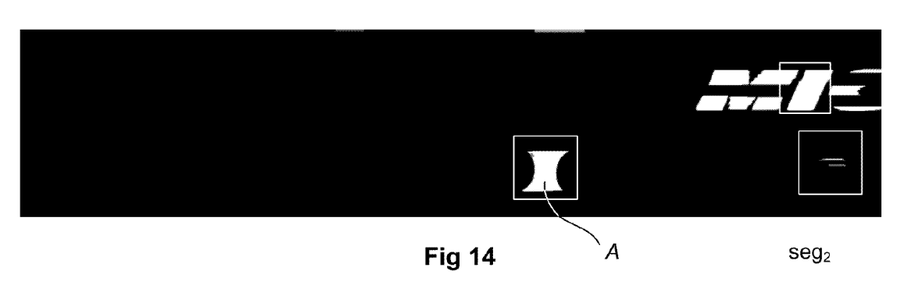
FIG. 14 represents the image of FIG. 7 in which relief patterns are included in encompassing boxes.

Accordingly, the pattern considered A is enclosed in an encompassing box of restricted dimension so as to constitute imagettes of small size containing the said white coloured relief pattern, and a part of the black coloured background, as is illustrated in FIG. 14.

Care will be taken, as previously, that each encompassing box contains only a single pattern. In the case where the said encompassing box were to contain a pattern of a given label and all or part of other different label patterns, it is possible, by choice, to change the shape of the encompassing box or, more easily, eliminate the parts of patterns whose label is different from the label of the pattern considered by replacing the values of these patterns with the value zero corresponding to the value (black) of the background.

Once these zones have been selected, the pixels corresponding to the imagette considered A are located in the starting image f, and a morphological opening of the said zone is performed with the aid of a linear structuring element oriented in the circumferential direction, denoted $\gamma_{150,A}(f)$. A structuring element of reduced size is chosen, the number of pixels of which corresponds to a length of a few millimeters. In the case of the example serving as support to the present description, the structuring element adopted has 150 pixels.

The subtraction between the imagette of the zone A contained in the starting image and the imagette contained in the image of the camber is then performed, $diff_A(f)=\gamma_{A,150}(f)-camber_A(f)$, to obtain a flattened imagette of the pattern.

After having carried out the flattening of the pattern or of the imagette containing the said pattern, the following operation consists in calculating the mean value and the standard deviation of the values of the grey levels of the pixels of the flattened pattern or of the flattened imagette, and in comparing these values with ranges of values or with predetermined thresholds representative of the mean heights of the patterns that it is sought to identify on the surface of the sidewall of the tyre.

In an experimental manner, it is considered that good results are obtained by adopting an interval corresponding to a height variation lying between 0.2 mm and 0.3 mm, for the average of the grey levels and a threshold corresponding to a height variation of less than or equal to 0.2 mm for the standard deviation of the grey levels.

The patterns whose mean values and standard deviations lie in the agreed limits are preserved in the binary image, and the patterns whose mean values are not within these limits are extracted from the binary image by reducing the pixels which form these patterns to the value zero, so that they coincide with the black value of the background.

Figure 15:
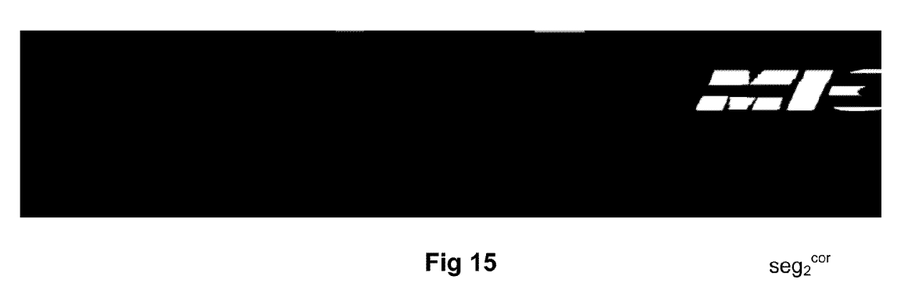
FIG. 15 represents the image of FIG. 13 corrected.

A corrected binary image is then obtained, such as represented in FIG. 15, where the image $seg_2^{cor}$ corresponds to the image $seg_2$ corrected by application of the calculation steps detailed hereinabove. It is observed that the bridge between the two bars has disappeared.

Figure 16:
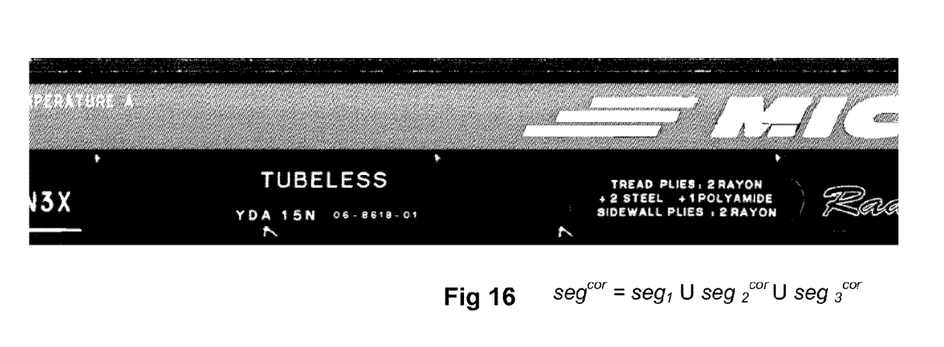
FIG. 16 represents the set-theoretic union of the corrected binary images.

The final binary image is obtained by performing the sum or else the set-theoretic union of the binary images, corrected or not: $seg=seg_1 \cup seg_2^{cor} \cup seg_3$ as is illustrated in FIG. 16.

It then becomes possible to extract the patterns and to undertake the subsequent processings of the image with a view to determining the compliance of the tyre.

The exemplary implementation of the method according to the invention is not limiting and will be able to be adapted according to the indications given so as to address the analysis of tyres of varied sizes and use while taking into account the peculiarities of the patterns featuring on the sidewall.

The invention claimed is:

1. A method of extracting, from an image, relief marking patterns featured on a surface of a sidewall of a tyre, the method comprising steps of:
assigning, to each pixel (i, j) of a three-dimensional image of the surface of the sidewall, a grey-level value proportional to an elevation of a point corresponding to the pixel, so as to obtain a starting image ($f$);
performing a series of morphological opening operations ($\gamma_{150}(f), \gamma_{500}(f), \gamma_{7000}(f)$) on the starting image ($f$), using linear structuring elements of successively increasing sizes and oriented in a circumferential direction;
subtracting a value of an image obtained after a morphological opening operation using a structuring element from a value of an image obtained after a morphological opening operation using a structuring element of an immediately lower size ($f-\gamma_{150}(f), \gamma_{150}(f)-\gamma_{500}(f), \gamma_{500}(f)-\gamma_{7000}(f)$),
so as to obtain a succession of images flattened by differencing, wherein an initializing procedure is performed by subtracting an image obtained after a morphological opening operation using a structuring element of a smaller size from the starting image ($f$);
performing a thresholding operation on the images flattened by differencing, so as to obtain binary images ($Seg_1(f-\gamma_{150}(f))$, $seg_2(\gamma_{150}(f)-\gamma_{500}(f))$, $seg_3(\gamma_{500}(f)-\gamma_{7000}(f))$); and
performing a set-theoretic union of values of each of the binary images, so as to obtain a final binary image in which marking patterns appear in relief ($seg=seg_1 \cup seg_2 \cup seg_3$).

2. The method according to claim 1, wherein, prior to the step of performing the series of morphological opening operations, the three-dimensional image of the surface of the sidewall is unfolded in an orthogonal reference frame (OXY) in which an abscissa axis (OX) represents circumferential values and in which an ordinate axis (OY) represents radial values.

3. The method according to claim 1, wherein three successive iterations of the morphological opening operations ($\gamma_{150}(f), \gamma_{500}(f)$, and $\gamma_{7000}(f)$) on the starting image ($f$) are carried out using a first structuring element, a second structuring element, and a third structuring element.

4. The method according to claim 3, wherein the first structuring element includes a number of pixels corresponding to a length lying between 4 and 10 mm.

5. The method according to claim 3, wherein the second structuring element includes a number of pixels corresponding to a length lying between 15 and 30 mm.

6. The method according to claim 3, wherein the third structuring element includes a number of pixels corresponding to a length lying between 200 and 400 mm.

7. The method of according to claim 1, wherein, on completion of the step of subtracting the value of the image obtained after a morphological opening operation using a structuring element from the value of the image obtained after a morphological opening operation using a structuring element of an immediately lower size, the method further comprises steps of:
transforming a flattened image by performing a morphological opening operation using a linear structuring element oriented in a radial direction, to obtain a resulting image ($\rho_{500}(f-\gamma_{150}(f))$); and
subtracting the resulting image from the flattened image.

8. The method according to claim 7, wherein the linear structuring element includes a number of pixels corresponding to a length lying between 15 and 30 mm.

9. The method according to claim 1, wherein, in the step of performing the thresholding operation, thresholding of a grey level corresponding to a height variation of greater than or equal to 0.15 mm is performed.

10. The method according to claim 1, wherein, on completion of the step of performing the thresholding operation, the method further comprises steps of:
identifying disjoint patterns (A) in each binary image;
determining an image of a camber of the starting surface (camber($f$));
for a pattern under consideration in the image of the camber, subtracting a grey-level value of pixels corresponding to the pattern from a grey-level value of pixels corresponding to the pattern in the starting image ($diff_A(f)=\gamma_{A150}(f)-camber_A(f)$), so as to obtain a flattened pattern;
calculating a mean value and a standard deviation of grey levels of the flattened pattern; and
deleting the pattern in the binary image ($seg_i$) when:
the mean value of the grey levels does not lie in a given interval, and
the standard deviation of the grey levels is greater than a predetermined threshold, so as to obtain a corrected binary image ($seg_i^{cor}$) in which wrongly detected patterns are deleted.

11. The method according to claim 10, wherein, to determine a camber of the surface of the sidewall, the method further comprises a step of:
performing a series of morphological operations on the starting image ($f$) using linear structuring elements of increasing size and oriented in a circumferential direction (camber($f$)=$\phi_{17000}(\gamma_{7000}(\phi_{500}(\gamma_{500}(f))))$), so as to obtain an image of the camber of the surface of the sidewall in which salient patterns, or sunken objects, or raised objects, or a combination thereof, are deleted.

12. The method according to claim 11, further comprising a step of successively performing:
a morphological opening operation on the starting image using a linear structuring element that includes a number of pixels corresponding to a length lying between 4 and 10 mm ($\gamma_{500}(f)$),
a morphological closing operation on a previous image using a structuring element that includes a number of pixels corresponding to a length lying between 4 and 10 mm ($\phi_{500}(\gamma_{500}(f))$),
a morphological opening operation on a previous image using a structuring element that includes a number of pixels corresponding to a length lying between 200 and 400 mm ($\gamma_{7000}(\phi_{500}(\gamma_{500}(f)))$), and
a morphological closing operation on a previous image using a structuring element that includes a number of pixels corresponding to a length lying between 500 and 800 mm ($\phi_{17000}(\gamma_{7000}(\phi_{500}(\gamma_{500}(f))))$).

13. The method according to claim 10, wherein, before the step of subtracting the grey-level value of pixels corresponding to the pattern under consideration in the image of the camber from the grey-level value of pixels corresponding to the pattern in the starting image, the method further comprises steps of:

enclosing the pattern in an encompassing box, so as to obtain an imagette containing only the pattern; and flattening the imagette containing the pattern.

14. The method according to claim 10, wherein the interval of the mean value of the grey levels corresponds to a height variation lying between 0.2 mm and 0.3 mm.

15. The method according to claim 10, wherein a value of the predetermined threshold of the standard deviation of the grey levels corresponds to a height variation of less than or equal to 0.2 mm.

16. The method according to claim 10, wherein, to determine a camber of the surface of the sidewall, the method further comprises a step of:

performing a series of morphological opening operations on the starting image using structuring elements of increasing size and oriented in a circumferential direction, so as to obtain an image of the camber of the surface of the sidewall in which salient patterns or objects or both are deleted.

17. The method according to claim 16, further comprising a step of successively performing:

a morphological opening operation on the starting image using a structuring element that includes a number of pixels corresponding to a length lying between 4 and 10 mm, a morphological opening operation on a previous image using a structuring element that includes a number of pixels corresponding to a length lying between 200 and 400 mm, and a morphological opening operation on a previous image using a structuring element that includes a number of pixels corresponding to a length lying between 500 and 800 mm.

\* \* \* \* \*